(No Model.)
H. BENCKE & P. LORILLARD, Jr.
TRANSPARENT PICTURE.
No. 315,703. Patented Apr. 14, 1885.
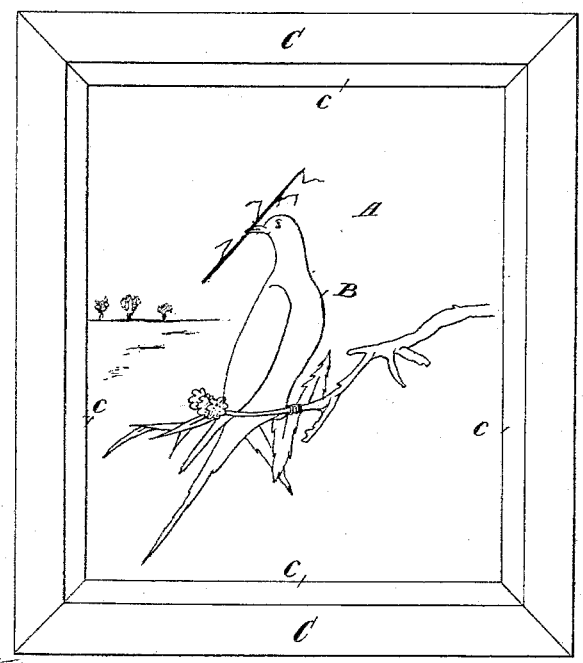
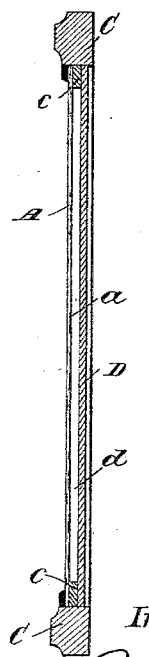
Attest:
Geo. H. Botts
J. A. Hovey
Inventor:
Herman Bencke
and
Pierre Lorillard Jr

UNITED STATES PATENT OFFICE.

HERMAN BENCKE AND PIERRE LORILLARD, JR., OF NEW YORK, N. Y.

TRANSPARENT PICTURE.

SPECIFICATION forming part of Letters Patent No. 315,703, dated April 14, 1885.

Application filed December 30, 1884. (No model.)

*To all whom it may concern:*

Be it known that we, HERMAN BENCKE and PIERRE LORILLARD, Jr., citizens of the United States, residing at New York, county of New York, State of New York, have invented certain new and useful Improvements in Transparent Pictures, fully described and represented in the following specification and the accompanying drawings, forming a part of the same.

This invention relates to that class of pictures which are printed or painted upon the reverse side of plates of glass or other transparent substance, so that in looking at the picture it is always seen through the transparent plate upon which it is printed or painted. These pictures are sometimes produced by painting directly upon the glass with transparent or translucent colors, and sometimes by the process of photography, either by photographing directly onto the glass or by taking a negative and then printing from that onto the glass, and then in either case coloring the picture by hand. When, however, it is desired to produce pictures of this class in large quantities and at a comparatively small cost, using transparent or translucent colors, it has been most common to first print the picture upon a sheet of paper or other similar material by the ordinary chromo-lithographic process, and then transfer the completed picture from the paper to the glass by the ordinary transfer process. By thus having the picture directly on the glass, and by viewing it through the glass, the effect of the transparent or translucent colors is very much improved, and a smooth and softened appearance is produced which it is impossible to obtain in any other way. The pictures of this class have sometimes been mounted without any backing, so that the light would fall fully upon both sides of the picture; but they have more commonly been provided with an opaque backing placed directly against the back of the glass upon which the picture was painted or printed, so that the light was entirely shut off from the back of the picture. When the picture is not provided with any backing, so that the light is allowed to fall equally upon both sides, the effect due to the brilliancy of the colors is to a considerable extent lost, while if the backing is placed directly against the glass, so that the light is entirely shut off from the back of the picture, the brilliant effect of the colors is preserved, but the shading and blending of the colors and the more delicate of the tints are rendered abrupt and hard to a certain degree, so that the general appearance and effect of the picture are impaired. We have discovered, however, that by removing the backing a short distance from the glass upon which the picture is printed or painted, so that a small amount of light will be permitted to pass through the glass and fall upon the back side of the picture, these defects are entirely removed and the picture is given an appearance very closely resembling, and nearly if not quite equal to, the best porcelain painting.

In the accompanying drawings, Figure 1 is a front view of a picture mounted according to the present invention. Fig. 2 is a cross-section of the same, and Fig. 3 is a rear view of the same with the backing removed.

Referring to said views, it is to be understood that A is a plate of glass or other transparent substance, upon the rear side, *a*, of which there is printed or painted in transparent colors the picture B. The plate A bearing the picture is mounted in an ordinary frame, C, and is provided with the usual backing, D. The backing D, instead of being placed in close proximity to the rear side, *a*, of the plate A and directly against the picture B, so as to exclude all light from the rear of the picture, as has heretofore been common, is removed a short distance, so as to leave a small space, *d*, between the plate A and the backing, thus permitting a certain amount of light to pass through the plate A and fall upon the rear side of the picture B. By this means the shading and tints of the picture are toned and softened, so as to give to it the appearance of a fine porcelain painting, as before stated. The distance which the backing D will be removed from the plate A will depend to some extent upon the character of the picture and the colors employed, and therefore the exact distance which it should be removed to produce the best effect with any given picture can only be determined by actual trial with the particular picture.

The backing may be held away from the plate A by any suitable means; but a simple rim, c, of wood or pasteboard inserted between the plate A and the backing will be found all that is necessary.

What we claim is—

The combination, with the transparent or translucent plate A, bearing the transparent or translucent picture B, of the backing D, removed a short distance from the said plate, substantially as and for the purpose set forth.

In testimony whereof we have hereunto set our hands in the presence of two subscribing witnesses.

HERMAN BENCKE.
PIERRE LORILLARD, Jr.

Witnesses:
AUGUST WINDICH,
A. C. LEFMAN.

Witnesses as to P. Lorillard, Jr.:
GEO. D. FINLAY,
CHAS. H. BARKELEW.